March 20, 1956 H. H. SCHOTT 2,738,959
MIXER BEATER EJECTOR
Filed Feb. 17, 1953 2 Sheets-Sheet 1

INVENTOR
HOWARD H. SCHOTT
BY William C. Babcock ATTORNEY

March 20, 1956   H. H. SCHOTT   2,738,959
MIXER BEATER EJECTOR
Filed Feb. 17, 1953   2 Sheets—Sheet 2

INVENTOR
HOWARD H. SCHOTT
BY William C. Babcock   ATTORNEY

United States Patent Office 2,738,959
Patented Mar. 20, 1956

2,738,959

MIXER BEATER EJECTOR

Howard H. Schott, St. Paul, Minn., assignor to General Mills, Inc., a corporation of Delaware Application February 17, 1953, Serial No. 337,333

14 Claims. (Cl. 259—1)

The present invention relates to shaft uncoupling devices and more particularly to improved beater ejectors for household food mixers.

In food mixers and some other appliances and tools it has been customary to provide a beater or tool shaft which may be releasably connected to a drive shaft of an appropriate power unit. In some of these cases, the shaft of the beater or accessory is held in driving engagement with the power unit drive spindle by some sort of resilient means which will yield in response to axial forces along the accessory shaft to permit withdrawal of the accessory. Various devices have been proposed for application of the axial ejecting forces through some manually operable linkage. Some of these devices have applied the force directly with no amplification, so that it was difficult to perform the ejecting operation. Other devices have involved more complicated linkages with a relatively large number of parts which have been uneconomical to produce.

With these problems of the prior art in view it is accordingly one object of the present invention to provide an improved shaft ejecting mechanism.

A further object is the provision of an improved beater ejector for a household food mixer in which extremely high amplification of the manually applied force is obtained.

A further object is such a beater ejector which shall involve a relatively small number of parts and a simple form of construction which offers economies in manufacture as well as in operation.

A further object is the provision of such beater ejecting mechanism in a separate recess in the power unit casing where the mechanism can be installed, adjusted, or removed without access to the gear chamber of the power unit.

A still further object is the provision of a construction in which the beater ejecting mechanism is substantially completely enclosed and concealed in a separate chamber within the normal outlines of the power unit.

Another object is the provision of a beater ejecting mechanism in which the desired ejecting forces are applied by a toggle-like unit.

Other objects and advantages of the invention will be apparent from the following specification in which certain preferred embodiments are described.

In the drawings which form a part of this specification and in which like reference characters indicate like parts, Figure 1 is a side view, partly broken away, of a household food mixer which incorporates one embodiment of the invention.

Fig. 2 is a partial perspective view of the beater driving and beater ejecting mechanism of the device of Fig. 1, with portions broken away for clearness.

Figs. 3, 4, and 5 are enlarged partial sectional views of details of the beater shaft retaining mechanism.

Figure 2:
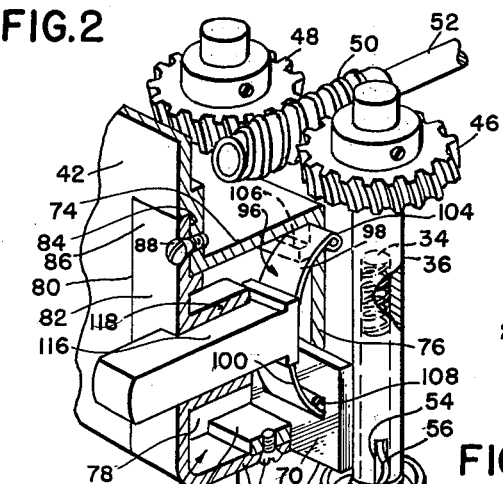

In Figs. 1 to 6, one embodiment of the present invention is illustrated in a household food mixer which includes a power unit 20 pivoted or otherwise supported at 22 on the upper end of a pedestal 24. This pedestal is located at one end of a base 26 which carries a mixing bowl 28 at its other end. One or more beaters or agitators 30 having beater shafts 32 may be connected with corresponding beater drive spindles such as the spindle 36 located in an appropriate gear casing section 38 at one end of the power unit. Beater drive spindle 36 in this case extends vertically upwardly through a bearing portion 39 of the power unit casing and includes an axial cylindrical recess 34 into which the upper end of the beater drive shaft 32 may be projected. The power unit includes casing side walls 40, a front wall 42, and bottom wall 44 which cooperate to provide an enclosed gear and lubricating chamber into which the drive spindle 36 projects. In this case two beater drive spindles are illustrated having gears 46 and 48 at their upper ends within the gear and lubricating chamber. These gears are engaged by a driving worm 50 which extends between them and is located on the forward end of motor shaft 52. Rotation of the motor shaft 52 will thus cause rotation of gears 46 and 48 and of their corresponding drive spindles 36 in opposite directions.

In order to provide a driving engagement between the beater drive spindle 36 and beater shaft 32, the lower end of the drive spindle is provided with axial notches 54 into which radial projections 56 of the beater drive shaft may be engaged by an axial telescoping movement of the beater shaft 32 into the drive spindle 36.

Figure 3:
Figure 4:
Figure 5:

In order that the beater shaft 32 may be releasably retained in this driving engagement, the drive spindle 36 is provided with an external annular recess at its lower end in which an expandable spring ring 58 is mounted. As illustrated in Figs. 3, 4, and 5, the internal diameter of this spring ring is slightly greater than the external diameter of the beater shaft, but is smaller than the width of the radial projecting portions 56. These portions 56 are sloped at their upper and lower ends to provide cam surfaces 60 and 62 which engage the inside of the spring ring 58 during assembly and disassembly of the beater shaft with the drive spindle. Thus with the parts in the disengaged position of Fig. 3 an upward axial movement of the beater shaft 32 will cause camming engagement between the portions 60 and the spring ring 58 to expand the ring and permit the shaft to pass upwardly through the position of Fig. 4 to the driving position of Fig. 5. The parts will then be retained in the position of Fig. 5 by the resilience of ring 58. In place of this expandable ring 58 and the projections 56 on the beater shaft 32, it will be apparent that other means may be provided for resiliently retaining the beater shaft in driving engagement with the spindle 36.

To facilitate the application of the necessary downward axial force for removal of the beater shaft from the position of Fig. 5 through the position to Fig. 4 to the position of Fig. 3, each beater shaft is provided with an annular collar 64 having an upwardly facing ejecting rim or shoulder 66 against which the lower end 68 of a suitable ejecting member 70 may engage. In the embodiment of Figs. 1 to 6, this ejecting member 70 is in the form of a rectangular plate which may be considered as an ejector slide mounted within the motor unit casing for vertical reciprocation along a path parallel to the beater shaft 32 and drive shaft 36.

In this case the ejector slide 70 and its associated parts are supported in a recess 72 which is formed within the front lower end of the power unit casing by an inwardly projecting upper wall portion 74 spaced above the bottom of the casing, a vertical wall portion 76 parallel to the front wall 42 of the casing and spaced rearwardly thereof, and suitable side wall portions 78 which intersect at right angles all of the walls 42, 74, and 76. Thus a rectangular prismatic recess is formed in the front lower end of the casing, with imperforate partitions which effectively separate this recess from the bearing portions 39 and lubrication chamber 40 of the power unit.

As described up to this point the recess is formed by walls which are integral with the external walls of the power unit casing and thus provide an opening at 80 in the front and bottom of the power unit. This opening 80 is closed by a removable cover member 82 having angularly related portions which are adapted to lie flush with the front and bottom walls of the power unit. An inwardly offset seat 84 at the upper end of the opening 80 is engaged by the upper end 86 of this cover member 82 and is held in position at this point by a suitable bolt 88. The bottom or angularly disposed wall 90 of the cover 82 is secured at its inner end to a crossbar 92 by another bolt 94. Thus the cover member 80 closes the open recess 72 and provides a smooth external appearance to the front end of the power unit.

According to one important feature of the present invention, the beater ejecting mechanism includes a toggle-like unit indicated generally at 96. The toggle-like unit has first and second legs 98 and 100, respectively, which are flexibly connected and angularly oriented with respect to each other at an obtuse angle. In such a unit, the application of forces to the central or flexibly connected portion of the toggle unit in a direction at right angles to the line defined by the ends of the respective legs, so as to force the central portion of the toggle unit toward such line, will result in separating movement of the ends of the respective legs.

In this particular embodiment of the invention, the toggle-like unit is formed of a single integral spring member in which the legs 98 and 100 in the flexible central portion 102 are parts of a single piece of spring material. This spring member is so formed that it is resiliently biased into the position shown in Fig. 2, wherein the legs 98 and 100 are angularly disposed as stated above.

The end of the first or upper leg 98 of the toggle unit 74 is provided with means anchoring this end at what might be considered an upward extension of the vertical path of movement of the ejector slide 70. The lower end of the lower leg 100 of the toggle unit 96 is provided with ejecting means for the beater shafts, which in this example involves an operative connection to the vertical ejector slide 70. The anchoring means for the upper end of the upper toggle leg 98 involves the provision of a rolled end at 104 on the spring member, this rolled end being adapted to fit above a ledge or abutment 106 which projects forwardly from the rear partition wall 76 just below and parallel to the top partition wall 74 of the recess. Thus the curled end 104 of the spring leg 98 is effectively anchored against vertical movement by its location between the ledge 106 and the upper wall 74.

Figure 7:
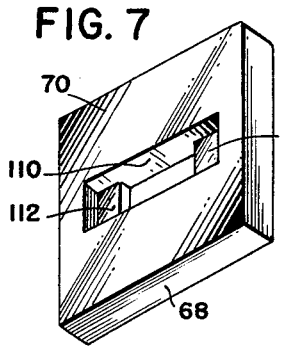
Fig. 7 is an enlarged perspective view of the ejector slide incorporated in the device of Figs. 1 through 6.

To provide the desired ejecting connections at the lower end of the toggle unit, the lower end of the lower leg 100 is return-bent or curled on itself at 108. This lower end portion 108 is then received in a cross slot 110 in the ejector slide 70, so that vertical movement of the lower end of the bottom toggle leg 100 will result in corresponding vertical movement of the slide 70. As shown in Fig. 7, the slot 110 does not extend all the way through the slide 70. Instead, ledges 112 and 114 are provided at the rear edge of the slide and at the ends of the slot to engage the ends of the curled spring portion 108. The pressure of the lower toggle end 108 against ledges 112 and 114 will thus hold the ejector slide 70 against the rear wall 76 which thus cooperates with the side walls 78 of the recess to provide a guideway for vertical reciprocation of the slide 70.

Figure 6:
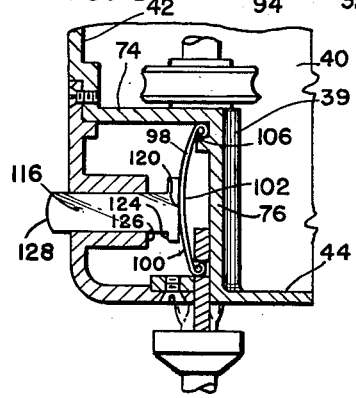
Fig. 6 is an enlarged partial side view of the mechanism of Fig. 2 with the parts in ejecting position, and with portions broken away for clearness.

From the construction just described, it will be apparent that the application of force against the central portion 102 of the toggle unit in a direction tending to force the central portion back toward the line joining ends 106 and 108 of the toggle unit, i. e., back toward the partition wall 76, will result in flattening of the toggle unit from the position illustrated in Fig. 2 toward the position illustrated in Fig. 6. Because the toggle legs 98 and 100 are angularly disposed at an obtuse angle in Fig. 2 and approach a 180° position in the ejecting position of Fig. 6, there will be extremely high magnification of the forces applied to the central portion 102. Thus substantially greater forces will be transmitted by the ejecting slide 70 to the beater shaft ejecting rims 66 than the force actually applied transversely toward the central portion 102 of the toggle.

For convenient application of the necessary force to the toggle unit 96, an operating member 116 is provided. This member is supported in a suitable opening or guideway 118 formed in the removable cover 82. The location and orientation of this guideway 118 are such that operating member 116 may reciprocate longitudinally of the power unit and casing along a path intersecting the central portion 102 of the toggle unit 96. Thus the inner end 120 of the operating member 116 will engage this central portion 102 to flatten the toggle unit in response to movement of member 116 inwardly and longitudinally of the casing. This engagement of the inner end 120 of the operating member 116 against the central portion 102 of the toggle unit will also limit the inward movement of the operating member.

Outward or retracting movement of the operating member 116 in response to the resilient tendency of toggle unit 96 to restore itself to the position of Fig. 2 may be limited by engagement of the projecting shoulder 124 at the inner end of operating member 116 against the inner end 126 of the guideway 118 in cover 82. In this retracted position, the outer end 128 of the operating member 116 will project forwardly and outwardly through the cover 82 so that this portion is conveniently accessible for manual operation in the front of this power unit. Application of manual forces to this projecting end portion 128 will thus cause inward horizontal movement of the operating member 116 which will be converted by the linkage just described into vertical downward movement of the ejecting slide 70 with substantially high amplification of the applied force.

The degree of force amplification can be controlled, of course, by the original angular disposition of the toggle legs 98 and 100. The more the original angular orientation of these legs approaches 180°, the greater the magnification will be, subject only to the limitation that the angular orientation must be sufficiently less than 180° so that the desired vertical movement of the ejector slide 70 will be obtained before the toggle spring is completely flattened.

It will be noted in the construction of Figs. 1 to 6 that the imperforate partition 76 is so located that it guides the ejector slide 70 vertically along a path which is not only parallel to the path of axial telescoping movement of the beater shaft 32 for removal of the same, but which also lies substantially in the plane defined by the axial centers of the respective shafts. Thus, the ejector slide 70 extends in this plane so that its lower edge can engage simultaneously the ring portions 66 of each beater shaft 32 for simultaneous ejection of the two beaters.

Figure 8:
Fig. 8 is a partial side view with portions broken away, of another embodiment of the invention, with the parts in retracted or non-ejecting position.
Figure 9:
Fig. 9 is a view similar to Fig. 8 with the parts in ejecting position.
Figure 10:
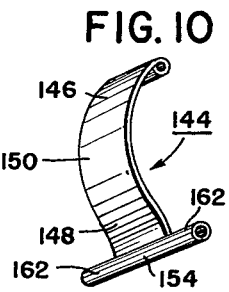
Fig. 10 is a perspective view of the toggle-like unit of the device of Figs. 8 and 9.

Another embodiment of the invention is illustrated in Figs. 8, 9 and 10 wherein a simplified construction is provided which makes it possible to omit the slide member 70 of the first embodiment.

Figure 1:
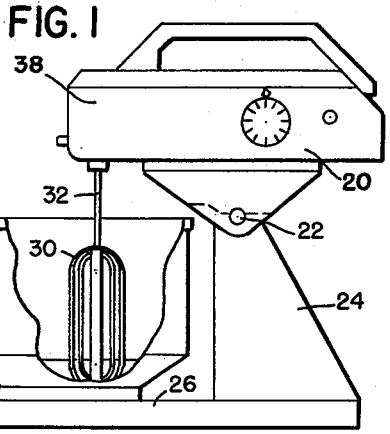

The device of Figs. 8 to 10 is shown in connection with the front lower end of a power unit casing 130 which is essentially similar to the power unit illusrated in Fig. 1. An outwardly-facing open recess is formed at 136 in the front lower portion of this casing by means of partition walls 132 and 134, and this recess is provided with a cover 138. This cover has a guideway 140 for the manual operating member 142 which is essentially similar to the previous embodiment in this respect.

In this case the toggle-like unit 144 is again shown as a single integral resilient spring having a bias which normally maintains it in the position shown in Fig. 8. In this position the upper and lower spring legs, 146 and 148 respectively, are flexibly connected at the central portion 150 by the inherent resilience of the spring and are oriented at an obtuse angle as shown. The end 152 of the upper spring leg 146 is curled or bent on itself and anchored above a ledge 153 so that the end is held between that ledge and the wall or partition portion 132. The end of the lower spring leg 148 is bent on itself at 154 to provide a cross section of sufficient strength for ejection of the beaters. This end portion 154 reciprocates vertically along the surface of the rear partition wall 134 and moves downwardly as the pressure of operating member 142 moves the central portion 150 of the toggle inwardly against the resilience of the spring. Upon release of the member 142 the resilience of the toggle spring restores the parts from the position of Fig. 9 to the position of Fig. 8.

In this embodiment it is necessary for the spring end 154 to project downwardly below the outer casing far enough to push the rim portion 66 on the beater shaft 32 to its ejecting position. In order that this toggle end 154 will have a bearing portion against which it may be pressed and guided during this flattening movement, the lower casing wall 156 carries a downwardly extending projection 158 between the two beater shafts. The front wall 160 of this projection 158 forms a smooth extension of the front surface of partition wall 134 and thus guides the lower end 154 of the toggle spring unit so that the parts move toward the position of Fig. 9.

As illustrated in Fig. 10, the end portion 154 of the toggle spring carries lateral extensions 162 which project laterally beyond the width of the toggle spring far enough to insure engagement with the rim portions 66 of the beater shafts 32. These extensions 162, as well as the main portion 154, are received in the cross slot 164 between the removable cover 138 and the partition 134 when the parts are in the retracted position of Fig. 8. Operation of this embodiment of the invention will be essentially similar to the operation of the previous embodiment. Inward pressure on the manual operating member 142 will flatten the toggle spring 144, and move its lower end 154 and extensions 162 downwardly to eject the beater shaft as shown in Fig. 9. Upon release of the member 142, the resilience of the toggle spring will restore the parts to the position of Fig. 8.

Figure 11:
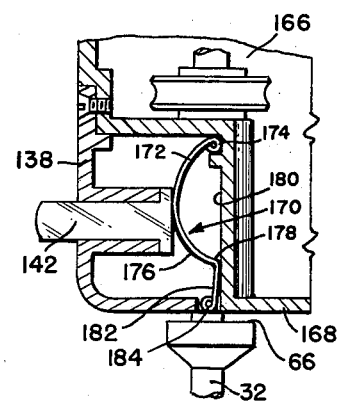
Fig. 11 is a view similar to Fig. 8 of another modification of the invention, with the parts in retracted position.
Figure 12:
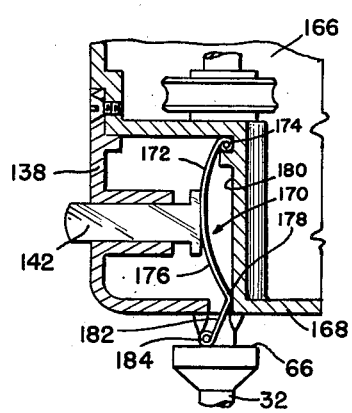
Fig. 12 is a similar view of the device of Fig. 11 with the parts in ejecting position.
Figure 13:
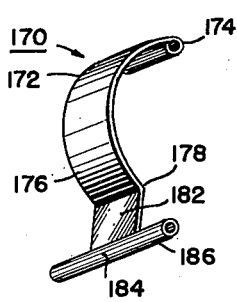
Fig. 13 is a perspective view of the toggle-like unit of the device of Figs. 11 and 12.

The embodiment of the invention shown in Figs. 11, 12 and 13 is generally similar to that shown in Figs. 8, 9 and 10, except that the toggle spring unit is so modified that no dependent projection is needed on the outer casing as a guide for the lower end of the toggle. Here the casing 166 has a bottom wall 168 similar to the corresponding parts of the preceding example, except for the omission of the depending projection as above stated. The toggle-like unit 170 is again formed as a single integral spring member with upper and lower legs 172 and 176 flexibly connected through the inherent resilience of the spring. The end 174 of the upper leg 172 is anchored vertically between an upper partition wall and an abutment as in the previous cases. The end 178 of the lower leg 176 is guided vertically along the front surface 180 of a vertical partition wall.

In this case the toggle spring 170 includes an extension 182 at its lower end 178. This extension projects generally along the line defined by the two ends 174 and 178 of the toggle unit. The lower end of this extension 182 is curled on itself at 184 and this curled portion 187 has lateral projections 186 adapted for engagement above the ejecting rim 66 on the beater shaft 32. The length of extension 182 is great enough to insure bearing engagement of point 178 on wall 180 even in ejecting position. The removable cover 138 carries the manual operating member 142 as in the previous case.

In this embodiment of the invention the resilience of the spring 170 ordinarily biases the parts to the retracted position shown in Fig. 11. Inward pressure on the manual operating member 142 is transferred by the inner end of this member to the central portion of the toggle spring 170 and causes flattening of the spring to the position of Fig. 12. In this position the end portions 184 and 186 are moved vertically downward against the ejecting rim 66 of beater shaft 32 to force the latter out of driving engagement with its spindle. The downward movement of portions 184 and 186 will be accompanied by some rocking in the direction from right to left in Fig. 12, as a result of flattening of the legs 172 and 176 of the toggle spring 170. This pivotal movement can, of course, be minimized by initial orientation of the toggle legs 172 and 176 at a relatively flat obtuse angle. Such rotation is also resisted by the frictional engagement of the ends 186 against the ejecting rims 66.

Figure 14:
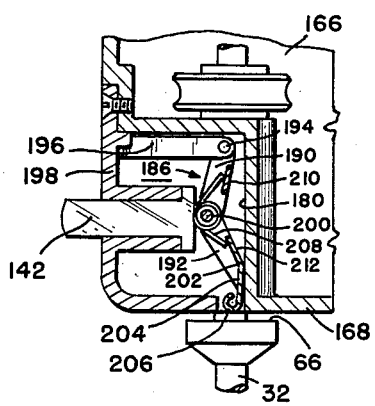
Fig. 14 is a view similar to Fig. 11 of still another embodiment of the invention, with the parts in retracted position.
Figure 15:
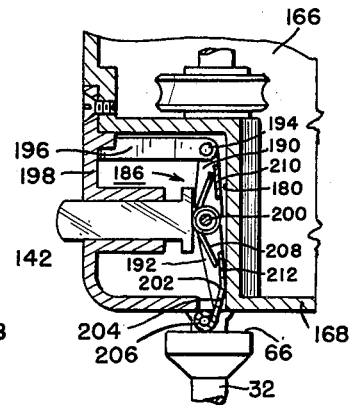
Fig. 15 is a view similar to Fig. 14 with the parts in ejecting position.
Figure 16:
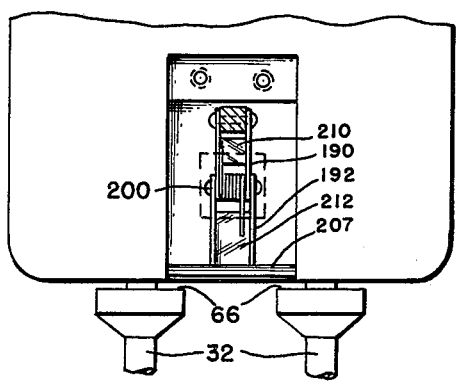
Fig. 16 is a partial front view of the device of Figs. 14 and 15, but with the cover and manual operating member removed.

In the embodiment shown in Figs. 14, 15 and 16, substantially similar principles are followed. In this case, however, the toggle-like unit 186 is formed with two relatively rigid legs 190 and 192 which are pivotally connected to each other at 200. The upper end of the first leg 190 is pivotally supported at 194 on the end of a suitable bracket 196 which is formed in this case as part of the removable cover 198. The point of pivotal connection 194 is close to the upper end of the partition wall 180 which serves to guide the lower leg of the toggle. This lower leg 192 has an end or bearing portion 202 which slides vertically on the front surface of wall 180. Lower leg 192 also has a depending vertical extension 204 which projects downwardly substantially along the line defined by the pivot 194 and the toggle end portion 202. The lower end of this extension 204 is return-bent or curled on itself to provide the desired rigidity. This curled portion projects laterally as shown at 207 (Fig. 16) for engagement of its ends above the rim 66 of the beater shafts 32.

Since the toggle unit in this case includes rigid legs which are pivoted to each other at 200, a separate resilient means must be provided normally urging relative rotation of the legs in a direction which will hold the parts in the retracted position of Fig. 14. For this purpose, a spring member 208 is coiled around the pivotal axis at 200 and has end portions engaging the cross members 210 and 212 of the toggle legs 190 and 192 respectively. As indicated in Figs. 14 and 16, these cross members 210 and 212 actually join two similar leg members in each case, so that both the upper and lower leg of the toggle unit are of U-shaped cross section for greater rigidity.

The extension 204 in this case serves the same purpose as the extension 182 of the preceding example. Thus the extension permits the ejecting portions 184 and 186 to project below the casing far enough to push the ejecting rim 66 of beater shaft 32 to its released position, without disengagement of the end 202 of the lower toggle leg from the vertical guiding surface of partition wall 180. As in the previous example there will be some rotation or rocking of the ejecting portion 206 and 207, but this will be minimized if the initial orientation of the toggle legs 190 and 192 is at a relatively flat obtuse angle.

According to the foregoing description, various embodiments of the present invention have been described which substantially accomplish the objects set forth at the beginning of this specification. These beater ejecting devices have the advantages of simplicity and economy of construction, coupled with high magnification of the applied forces and resulting ease of operation. Since minor variations and changes in the exact details of construction will be apparent to persons skilled in this field, it is intended that this invention shall cover all such changes and modifications as fall within the spirit and scope of the attached claims.

Now, therefore, I claim:

1. Beater ejecting mechanism for a food mixer having a rotatable drive spindle, a shaft adapted for removable driving engagement with said spindle, and retaining means holding the shaft and spindle in driving engagement and adapted for disengagement by forced relative axial movement of the shaft with respect to the spindle, said ejecting mechanism comprising a toggle-like unit having two leg portions inclined to each other at an obtuse angle and joined to each other at an intermediate point of the unit for relative separating movement of the outer ends of the legs in response to ejecting movement of said intermediate point in a direction at right angles to and toward the line determined by said outer ends, said toggle unit being mounted with the line determined by said outer ends extending substantially along the direction of relative movement of the shaft and with said intermediate point offset from said line, interengaging means on said shaft and one of said toggle leg outer ends causing relative axial disengaging movement of the shaft in response to ejecting movement of the intermediate point of the toggle along a path substantially at right angles to said shaft, an externally accessible, manually operable member having a portion operatively connected to said intermediate toggle point for producing said ejecting movement, and means supporting said manually operable member for movement of said portion along said path in response to manual operation of the member.

2. Beater ejecting mechanism for a food mixer having a rotatable drive spindle, a shaft adapted for removable driving engagement with said spindle, and retaining means holding the shaft and spindle in driving engagement and adapted for disengagement by forced relative axial movement of the shaft with respect to the spindle, said ejecting mechanism comprising a toggle-like unit having two leg portions inclined to each other at an obtuse angle and joined to each other at an intermediate point of the unit for relative separating movement of the outer ends of the legs in response to ejecting movement of said intermediate point in a direction at right angles to and toward the line determined by said outer ends, said toggle unit being mounted with said outer ends spaced along the direction of relative movement of the shaft, and each of said leg portions having a length less than the distance between said outer ends, interengaging means on said shaft and one of said toggle leg ends causing relative axial disengaging movement of the shaft in response to ejecting movement of the intermediate point of the toggle at right angles to said shaft, and an externally accessible manually operable member operatively connected to said intermediate toggle point for producing said ejecting movement, said toggle unit including means resiliently retracting the outer ends of the legs toward each other and thereby normally retaining the mechanism in inoperative non-ejecting position.

3. Beater ejecting mechanism according to claim 2 in which said leg portions constitute the opposite end portions of a single arched spring member, with said manually operable member operatively connected to an intermediate point of the spring to flatten the spring in said ejecting movement, the inherent resilience of said spring constituting the means resiliently retracting the spring ends to non-ejecting position.

4. Beater ejecting mechanism for a food mixer having a rotatable drive spindle, a shaft adapted for removable driving engagement with said spindle, and retaining means holding the shaft and spindle in driving engagement and adaped for disengagement by forced relative axial movement of the shaft with respect to the spindle, said ejecting mechanism comprising an ejector slide mounted for reciprocating movement parallel to the shaft, interengaging means on the slide and shaft for ejecting movement of the shaft in response to corresponding movement of the slide, a toggle-like unit having two leg portions flexibly joined to each other at an intermediate portion of the unit and inclined to each other at an obtuse angle for relative separating movement of the outer ends of said legs in response to ejecting movement of said intermediate portion in a direction at right angles to and toward the line determined by said outer ends, said toggle-like unit having the outer end of one leg operatively connected to said ejector slide and the outer end of the other leg anchored at a point in line with the path of movement of the ejector slide, and an externally accessible manually operable member operatively connected to said intermediate toggle portion for producing ejecting movement of the toggle and slide.

5. Beater ejecting mechanism for a food mixer having a rotatable drive spindle, a shaft adapted for removable driving engagement with said spindle, and retaining means holding the shaft and spindle in driving engagement and adapted for disengagement by forced relative axial movement of the shaft with respect to the spindle, said ejecting mechanism comprising an ejector slide mounted for reciprocating movement parallel to the shaft, interengaging means on the slide and shaft for ejecting movement of the shaft in response to corresponding movement of the slide, a toggle-like unit having two leg portions flexibly joined to each other at an intermediate portion of the unit and inclined to each other at an obtuse angle for relative separating movement of the outer ends of said legs in response to ejecting movement of said intermediate portion in a direction at right angles to and toward the line determined by said outer ends, said toggle-like unit having the outer end of one leg operatively connected to said ejector slide and the outer end of the other leg anchored at a point substantially in line with the path of movement of the ejector slide, and an operating slide mounted for reciprocation along a path at right angles to the line of movement of said ejecting slide and having means operatively engaging said intermediate portion of the toggle, said operating slide having an externally accessible portion for manual operation to cause ejecting movement of the toggle and ejector slide.

6. Beater ejecting mechanism according to claim 5 in which said toggle-like unit consists of a single arched spring member wtih its opposite end portions resiliently biased into obtuse angular relation to each other, the resilient bias of said spring thereby restoring the spring member, ejecting slide and operating slide to non-ejecting position after an ejecting movement.

7. Beater ejecting mechanism according to claim 6 in which the operating slide extends outwardly from the intermediate portion of the spring at the normally convex surface thereof, stop means limiting the movement of said operating slide away from said spring, and one end of the operating slide engaging and flattening said spring to produce an ejecting movement of the ejecting slide during movement of the operating slide away from said stop and being engaged by said spring for automatic return movement of the operating slide toward said stop in response to resiliently biased movement of the spring and ejecting slide to non-ejecting position.

8. Beater ejecting mechanism according to claim 6 in which the ejector slide has a recess extending transversely of its path of ejecting movement, said recess providing a pair of opposed abutments spaced along said path, and in which one end of the toggle spring extends into said recess thereby engaging one abutment to force the slide to ejecting position and engaging the other abutment to restore the slide to non-ejecting position.

9. Beater ejecting mechanism for a food mixer having a casing with walls defining a gear chamber within the casing, a rotatable drive spindle mounted in the casing and extending into said gear chamber and having one end exposed through one wall of the casing, an external implement shaft adapted for removable driving engagement with said exposed end of the spindle, and retaining means holding the shaft and spindle in driving engagement and adapted for disengagement by forced relative axial movement of the shaft with respect to the spindle, said casing having at least one wall portion shaped to provide an outwardly facing recess adjacent to said gear chamber and drive spindle but having an imperforate partition therebetween rendering said recess separate and distinct from said gear chamber, and a removable cover for said recess, said beater ejecting mechanism being located within said recess and having a manual operating member projecting outwardly of said casing and a beater ejecting portion movable axially of said shaft between a retracted position with respect to the casing and an ejecting position outside the casing and adjacent the shaft, and interengaging means on said beater ejecting portion and shaft outside of said gear chamber axially ejecting the shaft in response to movement of said ejecting portion to its ejecting position, said beater ejecting mechanism being completely accessible for initial assembly and subsequent repair and adjustment by removal of said cover without opening said gear chamber.

10. Beater ejecting mechanism according to claim 9 in which said removable cover has an opening through which said manual operating member projects.

11. Beater ejecting mechanism according to claim 9 in which said recess provides a guideway parallel to said spindle and shaft with an abutment at the inner end of the guideway, and said mechanism includes a toggle-like member having flexibly connected angularly-oriented first and second legs, with the outer end of the first leg engaging said abutment and the outer end of the second leg movable along said guideway and operatively connected to said beater ejecting portion, each of said leg portions having a length less than the distance between said outer ends, and said manual operating member being supported for movement at right angles to said guideway and toward the flexibly connected central portion of said toggle, thereby forcing the outer end of the second leg and the beater ejecting portion outwardly to beater ejecting position in response to inward movement of the manual member toward the guideway and against the central portion of the toggle.

12. Beater ejecting mechanism according to claim 11 in which said toggle-like member consists of a single bowed spring with its opposite end portions resiliently biased into obtuse angular relation to each other to constitute said first and second legs, said beater ejecting portion being formed as an integral part of the end of said second leg.

13. Beater ejecting mechanism according to claim 12 in which the first and second legs of said bowed spring are substantially symmetrical in length and curvature and in which said casing has an external projection adjacent said shaft, said projection having a flat surface constituting an external extension of said guideway for engagement by the end of the second leg of the spring when the latter is flattened to ejecting position.

14. Beater ejecting mechanism according to claim 12 in which the spring has a main bowed portion consisting of said first and second legs and a central portion which flexibly and resiliently connects the legs, and an extension constituting said beater ejecting portion integrally connected to the outer end of said second leg and intersecting said leg at an angle with the extension projecting generally along the line defined by the ends of said legs and parallel to the shaft, the line of intersection between said extension and said second leg providing a bearing surface engaging said guideway within the casing as said spring is flattened to ejecting position.

References Cited in the file of this patent

UNITED STATES PATENTS

| | | |
|---|---|---|
| 2,048,455 | Knapp | July 21, 1936 |
| 2,293,959 | Wright | Aug. 25, 1942 |
| 2,515,755 | Krause | July 18, 1950 |
| 2,605,085 | Gerry | July 29, 1952 |